(12) United States Patent
Sano et al.

(10) Patent No.: US 9,450,230 B2
(45) Date of Patent: Sep. 20, 2016

(54) LITHIUM-ION SECONDARY BATTERY INCLUDING POLYBENZIMIDAZOLE AND METHOD OF MANUFACTURING LITHIUM-ION SECONDARY BATTERY

(75) Inventors: Atsushi Sano, Tokyo (JP); Hisashi Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 224 days.

(21) Appl. No.: 12/702,801

(22) Filed: Feb. 9, 2010

(65) Prior Publication Data

US 2010/0216022 A1    Aug. 26, 2010

(30) Foreign Application Priority Data

Feb. 20, 2009 (JP) ................ P2009-038196

(51) Int. Cl.
| | |
|---|---|
| H01M 4/60 | (2006.01) |
| H01M 4/134 | (2010.01) |
| H01M 4/1395 | (2010.01) |
| H01M 4/62 | (2006.01) |
| H01M 4/02 | (2006.01) |

(52) U.S. Cl.
CPC ........... *H01M 4/134* (2013.01); *H01M 4/1395* (2013.01); *H01M 4/621* (2013.01); *H01M 4/622* (2013.01); *H01M 2004/027* (2013.01); *Y02E 60/122* (2013.01); *Y02P 70/54* (2015.11)

(58) Field of Classification Search
USPC ............ 429/233, 217, 213, 212, 209, 218.1; 29/623.5, 623.1; 427/58; 204/290.01, 204/286.1; 252/182.1; 428/145, 147, 446, 428/451

See application file for complete search history.

(56) References Cited

U.S. PATENT DOCUMENTS

| | | |
|---|---|---|
| 7,309,544 B2 | 12/2007 | Nobuta et al. |
| 2004/0043294 A1 | 3/2004 | Fukui et al. |
| 2004/0234865 A1 | 11/2004 | Sato et al. |
| 2005/0221172 A1* | 10/2005 | Kato et al. .................. 429/144 |
| 2006/0000071 A1* | 1/2006 | Dandekar et al. ........... 29/25.03 |
| 2006/0057449 A1* | 3/2006 | Calundann et al. ............ 429/33 |
| 2007/0092803 A1* | 4/2007 | Nakanishi et al. ........... 429/326 |
| 2007/0193885 A1* | 8/2007 | Benicewicz et al. ......... 205/637 |
| 2008/0063940 A1 | 3/2008 | Nobuta et al. |
| 2008/0254355 A1 | 10/2008 | Muraoka et al. |
| 2009/0027830 A1 | 1/2009 | Naruse |
| 2011/0183208 A1* | 7/2011 | Ohtsuka et al. ........... 429/218.1 |
| 2012/0189888 A1* | 7/2012 | Wang et al. .................... 429/94 |

FOREIGN PATENT DOCUMENTS

| | | | |
|---|---|---|---|
| CN | 1247388 A | 3/2000 | |
| CN | 1481042 A | 3/2004 | |
| CN | 1568558 A | 1/2005 | |
| JP | A-57-210568 | 12/1982 | |
| JP | A-6-290782 | 10/1994 | |
| JP | 11102705 | * 4/1999 | ............. H01M 4/58 |
| JP | 02997741 | * 1/2000 | ............. H01M 4/58 |
| JP | A-2000-149905 | 5/2000 | |
| JP | A-2002-124264 | 4/2002 | |
| JP | A-2002-260637 | 9/2002 | |
| JP | A-2007-180444 | 7/2007 | |
| JP | A-2007-201389 | 8/2007 | |
| JP | A-2008-262785 | 10/2008 | |
| WO | WO 2007/077906 A1 | 7/2007 | |

OTHER PUBLICATIONS

"New Polymer Experimental Studies ("Shin-Kobunshi Jikken Gaku")," Total vol. 10, the $3^{rd}$ Volume, Synthesis and Reaction of Polymer (2), pp. 155-159, 1996.
Kobayashi et al., "Application of Sio Anode for Various Electrolyte Systems," The $48^{th}$ International Symposium on Batteries, Fuel Cells and Capacitors Proceedings Extracts, pp. 230-231, 234-235, and 238-239, Nov. 13-15, 2007.
"Celazoletm™", published by Clariant (Japan) K.K., pp. 1-12, existed from 1997 to 2004.
PBI Advanced Materials Co., Ltd. Catalog, 2 pp., 2011.
Jul. 19, 2013 Notification issued in Japanese Application No. 2009-038196.

* cited by examiner

*Primary Examiner* — Raymond Alejandro
(74) *Attorney, Agent, or Firm* — Oliff PLC (57) ABSTRACT

A lithium-ion secondary battery including an electrode having a current collector and an active material layer, formed on the current collector, that contains an active material and polybenzimidazole. Also, a method of manufacturing a lithium-ion secondary battery including manufacturing an electrode having a current collector and an active material layer, formed on the current collector, that contains an active material and polybenzimidazole.

10 Claims, 3 Drawing Sheets

LITHIUM-ION SECONDARY BATTERY INCLUDING POLYBENZIMIDAZOLE AND METHOD OF MANUFACTURING LITHIUM-ION SECONDARY BATTERY

BACKGROUND OF THE INVENTION

1. Field of the Invention

The present invention relates to an electrode, a method of manufacturing an electrode, and a lithium-ion secondary battery.

2. Related Background Art

In general, an electrode of a lithium-ion secondary battery comprises a current collector and an active material layer formed on the current collector. The active material layer contains an active material and a binder (binding agent). Japanese Patent Application Laid-Open Nos. 2002-260637, 6-290782, 57-210568, 2002-124264, and 2008-262785 disclose lithium-ion secondary batteries using polyimide as a binder.

SUMMARY OF THE INVENTION

Recently, as demands for lithium-ion secondary batteries have been increasing, the batteries have been desired to further improve their performances. However, it has been difficult for the above-mentioned conventional lithium-ion secondary batteries to achieve desirable cycle characteristic and initial charging capacity. When Si or Si alloys which form alloys with Li are employed as a negative electrode active material in order to improve the charge/discharge capacity in particular, the active material layer repeatedly expands and shrinks as charging and discharging are repeated and thus is likely to crack and peel off from the current collector, whereby the desirable cycle characteristic is hard to achieve.

In view of the problems of the prior art mentioned above, it is an object of the present invention to provide an electrode which can improve the cycle characteristic of a lithium-ion secondary battery, a method of manufacturing the electrode, and a lithium-ion secondary battery using the electrode.

For achieving the above-mentioned object, the electrode in accordance with the present invention comprises a current collector and an active material layer, formed on the current collector, containing an active material and polybenzimidazole.

The lithium-ion secondary battery in accordance with the present invention comprises the electrode in accordance with the present invention.

Since the active material layer contains polybenzimidazole as a binder, the present invention can inhibit the active material layer from deforming when the temperature of the electrode changes as the battery is charged/discharged as compared with cases where conventional binders such as polyimide are used, whereby the cycle characteristic of the lithium-ion secondary battery can be improved.

Preferably, in the present invention, the active material contains Si. Preferably, in the present invention, the lithium-ion secondary battery further comprises an electrode using an active material containing Si as a negative electrode.

Active materials containing Si such as elemental Si and Si alloys contribute to improving the charge/discharge capacity in that they are easy to combine with Li, but may cause the cycle characteristic to deteriorate in that they are more likely to thermally expand than active materials such as graphite and thus easier to deform active material layers. By using an active material containing Si and polybenzimidazole as a binder, the present invention can satisfy both cycle characteristic and charge/discharge capacity.

The method of manufacturing an electrode in accordance with the present invention comprises the step of applying a coating material containing an active material and polybenzimidazole to a current collector, so as to form a coating made of the coating material on the current collector.

The method of manufacturing an electrode in accordance with the present invention can yield the electrode in accordance with the present invention.

Preferably, the method of manufacturing an electrode in accordance with the present invention further comprises the step of heating the coating to a temperature of 100 to 430° C.

A lithium-ion secondary battery using the active material layer obtained by heating the coating to a temperature of 100 to 430° C. can improve the initial discharging capacity and initial charge/discharge efficiency as well as the cycle characteristic.

The present invention can provide an electrode which can improve the cycle characteristic of a lithium-ion secondary battery, a method of manufacturing the electrode, and a lithium-ion secondary battery using the electrode.

DESCRIPTION OF THE PREFERRED EMBODIMENTS

In the following, a preferred embodiment of the present invention will be explained in detail with reference to the drawings. In the drawings, the same or equivalent parts will be referred to with the same signs, while omitting their overlapping explanations. Positional relationships such as upper, lower, left, and right are based on those illustrated in the drawings, unless otherwise specified. Ratios of dimensions in the drawings are not limited to those depicted.

Electrode and Lithium-Ion Secondary Battery

Figure 1:
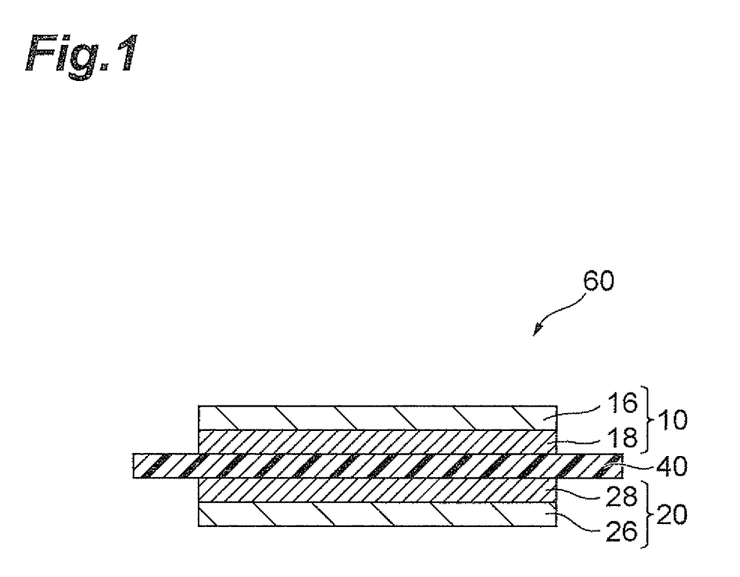
FIG. 1 is a schematic sectional view of a power generating element in a lithium-ion secondary battery which is an embodiment of the present invention.
Figure 2:
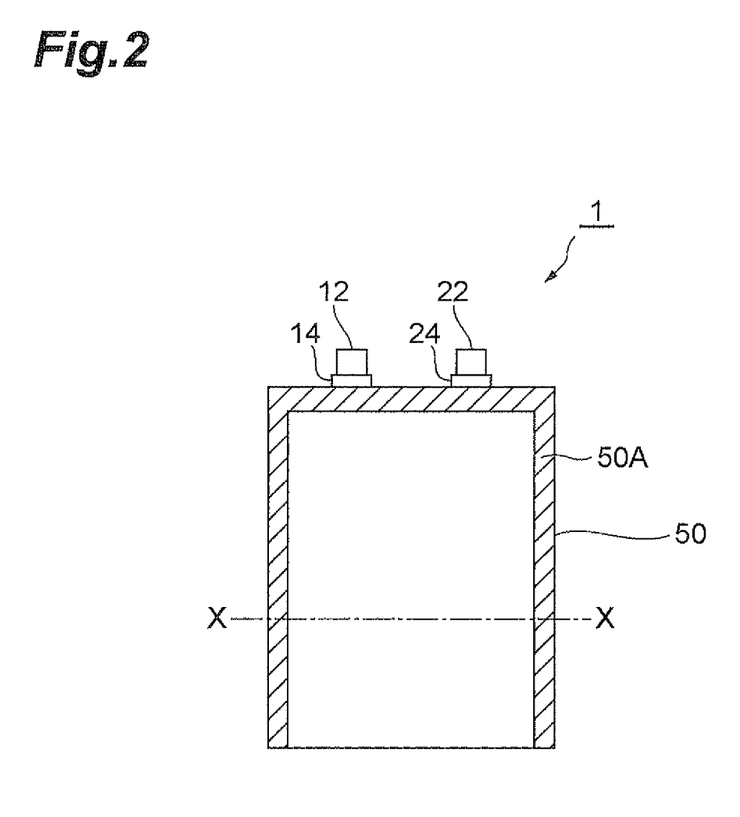
FIG. 2 is a front view of a lithium-ion secondary battery which is an embodiment of the present invention.
Figure 3:
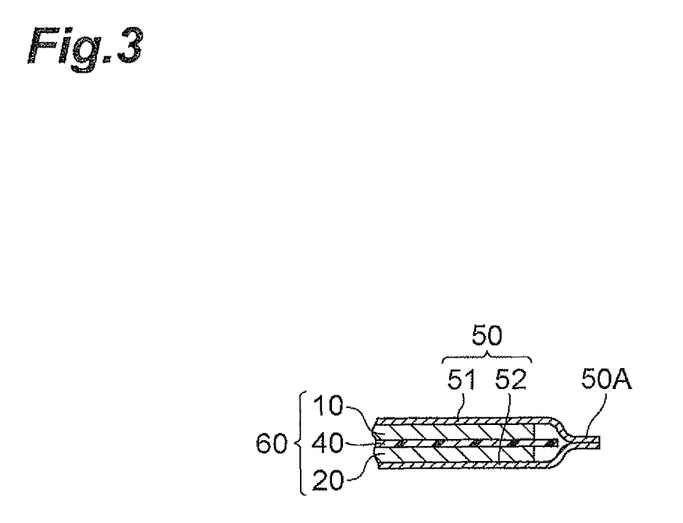
FIG. 3 is a schematic sectional view of the lithium-ion secondary battery taken along the line X-X of FIG. 2.

As illustrated in FIGS. 1 to 3, a lithium-ion secondary battery 1 is mainly constituted by a power generating element 60 comprising a pair of planar electrodes (a negative electrode 10 and a positive electrode 20) which oppose each other and a planar separator 40 arranged between and adjacent to the negative electrode 10 and positive electrode 20, an electrolytic solution (nonaqueous electrolytic solution in this embodiment) containing lithium ions, a case 50 accommodating them in a closed state, a negative electrode lead 12 having one end part electrically connected to the negative electrode 10 and the other end part projecting out of the case 50, and a positive electrode lead 22 having one end part electrically connected to the positive electrode 20 and the other end part projecting out of the case 50.

As illustrated in FIG. 1, the negative electrode 10 comprises a negative electrode current collector 16 and a negative electrode active material layer 18 formed on the negative electrode current collector 16. The positive electrode 20 is constituted by a positive electrode current collector 26 and a positive electrode active material layer 28 formed on the positive electrode current collector 26. The separator 40 is positioned between the negative electrode active material layer 18 and positive electrode active material layer 28.

The negative electrode active material layer 18 of the negative electrode 10 is manly constituted by a negative electrode active material and a binder (binding agent). The positive electrode active material layer 28 is mainly constituted by a positive electrode active material and a binder.

At least one of the negative electrode active material layer 18 and positive electrode active material layer 28 contains polybenzimidazole as a binder. Preferably, in this embodiment, both of the negative electrode active material layer 18 and positive electrode active material layer 28 contain polybenzimidazole as a binder. Advantageous effects of the present invention can also be obtained when one of the negative electrode active material layer 18 and positive electrode active material layer 28 contains polybenzimidazole while the other contains a binder other than polybenzimidazole. For convenience, a case where both of the negative electrode active material layer 18 and positive electrode active material layer 28 contain polybenzimidazole as a binder will be explained in the following.

In this embodiment, an example of polybenzimidazole is a polymer (resin) expressed by the following chemical formula (I):

[Chem. 1]

(I)

In the above-mentioned chemical formula (I), $R^1$ to $R^5$ and $R^{1'}$ to $R^{5'}$ are substituents which are selected independently from each other, $L^1$ is a divalent linking group, $L^2$ is a divalent linking group linking one of $R^1$ to $R^5$ to one of $R^{1'}$ to $R^{5'}$, and p and q are numbers representing respective degrees of polymerization. Here, $R^1$ to $R^5$ and $R^{1'}$ to $R^{5'}$ are, independently from each other, hydrogens, alkyl groups having a carbon number of 1 to 10, aryl groups having a carbon number of 6 to 12, halogens, hydroxyl groups, alkoxyl groups having a carbon number of 1 to 10, and the like; while $L^1$ and $L^2$ are, independently from each other, single bonds or divalent linking groups constituted by chalcogen atoms, aromatic compounds, aliphatic compounds, alicyclic compounds, heterocyclic compounds, and the like. Polybenzimidazole has a molecular weight on the order of 2,000 to 1,000,000, for example.

Polybenzimidazole contained in the active material layer in this embodiment is excellent in adhesion and thermal resistance. Therefore, as compared with cases where the conventional binders are used, this embodiment improves the adhesion between active material pieces and the adhesion between the active material layer and current collector, while inhibiting the active material layer from expanding and shrinking as the electrode changes its temperature at the time of charging/discharging, thereby preventing the active material layer from cracking and peeling off from the current collector. As a result, this embodiment can improve the cycle characteristic of the lithium-ion secondary battery as compared with the cases where the conventional binders are used.

The content of polybenzimidazole in the active material layer is preferably 2 to 10 mass %, more preferably 2 to 5 mass %, based on the whole amount of the active material layer. When the polybenzimidazole content is less than 2 mass %, as compared with the case where the content falls within the range mentioned above, the coating strength and the adhesion between the active material layer and current collector tend to decrease, thereby deteriorating the cycle characteristic. When the content exceeds 10 mass %, as compared with the case where the content falls within the range mentioned above, the internal resistance tends to increase, thereby deteriorating characteristics of the battery.

Usable as the binder contained in the active material layer in addition to polybenzimidazole are fluororesins/fluororubbers such as polyvinylidene fluoride (PVdF), polytetrafluoroethylene (PTFE), fluororubbers based on vinylidene fluoride/hexafluoropropylene (VDF/HFP-based fluororubbers), and fluororubbers based on vinylidene fluoride/hexafluoropropylene/tetrafluoroethylene (VDF/HFP/TFE-based fluororubbers); thermoplastic elastomeric polymers such as polyethylene, polypropylene, polyethylene terephthalate, aromatic polyamides, cellulose, styrene/butadiene rubber, isoprene rubber, butadiene rubber, ethylene/propylene rubber, styrene/butadiene/styrene block copolymers and their hydrogenated derivatives, styrene/ethylene/butadiene/styrene copolymers, and styrene/isoprene/styrene block copolymers and their hydrogenated derivatives; syndiotactic 1,2-polybutadiene; ethylene/vinyl acetate copolymers; propylene-α-olefin (having a carbon number of 2 to 12) copolymers; conductive polymers; and the like.

The negative electrode active material is not limited in particular as long as it allows occlusion and release of lithium ions, desorption and insertion (intercalation) of lithium ions, or doping and undoping of lithium ions and their counteranions (e.g., $PF_6^-$) to proceed reversibly; known negative electrode active materials can be used. Examples of such active materials include carbon materials such as natural graphite, synthetic graphite, non-graphitizing carbon, graphitizable carbon, and low-temperature-firable carbon; metals such as Al, Si, and Sn and alloys which are combinable with lithium; amorphous compounds mainly composed of oxides such as $SiO_x$ ($1<x\le2$) and $SnO_x$ ($1<x\le2$); lithium titanate ($Li_4Ti_5O_{12}$); and $TiO_2$.

Preferably, the negative electrode active material contains Si in this embodiment.

The negative electrode active material containing Si contributes to preventing short-circuits and improving the charge/discharge capacity in that it is easier to combine with Li and inhibits Li dendrites from being formed. However, the negative electrode active material containing Si tends to exhibit a coefficient of thermal expansion greater than that of active materials such as graphite (carbon). For example, upon charging, Si expands by about 4 times, while graphite expands by about 1.1 times. Therefore, the negative electrode active material containing Si is likely to cause the negative electrode active material layer to deform or decompose upon charging/discharging, whereby the cycle characteristic may deteriorate. By using the negative electrode active material containing Si and employing polybenzimidazole as a binder, this embodiment inhibits the negative electrode active material layer from deforming and decomposing when the negative electrode active material containing Si thermally expands, thereby making it possible to attain a sufficient charge/discharge capacity without deteriorating the cycle characteristic.

Examples of the negative electrode active material containing Si include elemental Si, alloys of Si and Cu, alloys of Si and Ni, and alloys of Si and Ti.

The content of the negative electrode active material in the negative electrode active material layer 18 is preferably 80 to 98 mass %, more preferably 85 to 97 mass %, based on the whole amount of the negative electrode active material layer 18. When the negative electrode active material content is less than 80 mass %, as compared with the case where the content falls within the range mentioned above, the energy density tends to decrease. When the negative electrode active material content exceeds 98 mass %, as compared with the case where the content falls within the range mentioned above, the adhesion force between the negative electrode active material layer 18 and current collector 16 tends to decrease, thereby lowering the cycle characteristic.

The positive electrode active material is not limited in particular as long as it allows occlusion and release of lithium ions, desorption and insertion (intercalation) of lithium ions, and doping and undoping of lithium ions and their counteranions (e.g., $PF_6^-$) to proceed reversibly; known electrode active materials can be used. Examples of such active materials include lithium cobaltate ($LiCoO_2$), lithium nickelate ($LiNiO_2$), lithium manganese spinel ($LiMn_2O_4$), mixed metal oxides expressed by the general formula of $LiNi_xCO_yMn_zM_aO_2$ (where x+y+z+a=1, 0≤x≤1, 0≤y≤1, 0≤z≤1, 0≤a≤1, and M is at least one kind of element selected from Al, Mg, Nb, Ti, Cu, Zn, and Cr), a lithium vanadium compound ($LiV_2O_5$), olivine-type $LiMPO_4$ (where M is at least one kind of element selected from Co, Ni, Mn or Fe, Mg, Nb, Ti, Al, and Zr, or VO), and mixed metal oxides such as lithium titanate ($Li_4Ti_5O_{12}$).

The content of the positive electrode active material in the positive electrode active material layer 28 is preferably 80 to 97 mass %, more preferably 85 to 96 mass %, based on the whole amount of the positive electrode active material layer 28. When the positive electrode active material content is less than 80 mass %, as compared with the case where the content falls within the range mentioned above, the energy density tends to decrease. When the positive electrode active material content exceeds 97 mass %, as compared with the case where the content falls within the range mentioned above, the adhesion force between the positive electrode active material layer 28 and current collector 26 tends to decrease, thereby lowering the cycle characteristic.

Preferably, the negative electrode active material layer 18 or positive electrode active material layer 28 contains a conductive auxiliary. The conductive auxiliary is not limited in particular; known conductive auxiliaries can be used. Examples include carbon materials such as carbon blacks, powders of metals such as copper, nickel, stainless steel, and iron, mixtures of the carbon materials and metal powders, and conductive oxides such as ITO.

The negative and positive electrode current collectors 16, 26 are not limited in particular as long as they are good conductors which can sufficiently transfer electric charges to the negative and positive electrode active material layers 18, 28, respectively, and do not form alloys with lithium in the case of the negative electrode current collector and do not corrode in the case of the positive electrode current collector. Examples of the negative and positive electrode current collectors 16, 26 include metal foils made of copper and aluminum, respectively.

The negative electrode current collector 16 is electrically connected to one end of the negative electrode lead 12, while the other end of the negative electrode lead 12 extends to the outside of the case 50 as illustrated in FIG. 2. The positive electrode current collector 26 is electrically connected to one end of the positive electrode lead 22, while the other end of the positive electrode lead 22 extends to the outside of the case 50 as illustrated in FIG. 2.

The part of the negative electrode lead 12 in contact with a seal part 50A is covered with an insulator 14 for preventing the negative electrode lead 12 from coming into contact with a metal layer of the case 50. The part of the positive electrode lead 22 in contact with the seal part 50A is covered with an insulator 24 for preventing the positive electrode lead 22 from coming into contact with the metal layer of the case 50. The insulators 14, 24 also serve to improve the adhesion between the innermost layer of the case 50 and the leads 12, 22.

Examples of the separator 40 include multilayer bodies of films constituted by any of polyethylene, polypropylene, and polyolefin, extended films or porous bodies of mixtures of these polymers, and fibrous nonwovens constituted by at least one kind of constituent material selected from the group consisting of cellulose, polyester, and polypropylene.

A surface of the negative electrode active material layer 18 or positive electrode active material layer 28 opposing the separator 40 may be formed with an insulating layer having a thickness of about 1 to 1,000 nm. This can prevent the electrodes from short-circuiting. Examples of the material constituting the insulating layer include aluminum oxide, zirconium oxide, titanium oxide, silicon oxide ($SiO_x$, where 1<x≤2), magnesium oxide, zinc oxide, iron oxide, copper oxide, and tin oxide ($SnO_x$, where 1<x≤2), which may also be used in combination.

The electrolytic solution (not depicted) fills the inner space of the case 50, while being partly contained within the negative electrode 10, positive electrode 20, and separator 40. As the electrolytic solution, a nonaqueous electrolytic solution in which a lithium salt is dissolved in an organic solvent is used. Examples of the lithium salt include $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$. These salts may be used either singly or in combinations of two or more. The electrolytic solution may be gelled by addition of polymers and the like thereto.

Examples of the organic solvent usable for dissolving the lithium salt include single and mixed solvents of cyclic carbonates, chain carbonates, lactones, and esters. More specifically, preferred examples include propylene carbonate, ethylene carbonate, and diethyl carbonate. They may be used either singly or in mixtures of two or more at any ratios.

As illustrated in FIG. 3, the case 50 is formed by a pair of opposing films (first and second films 51, 52). Edge parts of films opposing and overlapping each other are sealed with an adhesive or by heat-sealing, so as to form the seal part 50A.

The film constituting the first and second films 51, 52 is a flexible film. This film is not limited in particular as long as it is a flexible film, but preferably has at least an innermost layer made of a polymer in contact with the power generating element 60 and a metal layer arranged on the side of the innermost layer opposite from the side in contact with the power generating element from the viewpoint of effectively preventing moisture and air from entering the inside of the case 50 from the outside and electrolyte components from dissipating from the inside to the outside of the case 50, while securing sufficient mechanical strength and lightweight of the case.

Method of Manufacturing Electrodes and Lithium-Ion Secondary Battery

The above-mentioned negative electrode 10, positive electrode 20, and lithium-ion secondary battery 1 can be manufactured by the following procedure, for example.

First, the negative electrode 10 comprising the negative electrode current collector 16 and the negative electrode active material layer 18 formed on the negative electrode current collector 16 is made. Also, the positive electrode 20 comprising the positive electrode current collector 26 and the positive electrode active material layer 28 formed on the positive electrode current collector 26 is made.

For making the negative electrode 10, a negative electrode coating material containing a negative electrode active material and polybenzimidazole is applied to the negative electrode current collector 16, so as to form a negative electrode coating made of the negative electrode coating material on the negative electrode current collector 16. Conductive auxiliaries and binders other than polybenzimidazole may also be added to the negative electrode coating material when necessary.

Preferably, the negative electrode coating is heated to a temperature of 100 to 430° C. in this embodiment. Specifically, for example, the negative electrode coating is blown with a hot wind at 100 to 430° C. in the air. This forms the negative electrode active material layer 18 on the negative electrode current collector 16. The coating is preferably heated for about 10 to 300 min, more preferably about 60 to 240 min.

The negative electrode active material layer 18 may be formed on the negative electrode current collector 16 by drying the negative electrode coating at room temperature instead of heating it. The negative electrode coating may be extended before or after heating or drying. The positive electrode 20 is made by the same method as with the negative electrode 10 except that the positive electrode active material is contained in the coating material instead of the negative electrode active material.

This embodiment forms the negative and positive electrode active material layers 18, 28 by heating the negative and positive electrode coatings to a temperature of 100 to 430° C., and thus can improve not only the cycle characteristic of the lithium-ion secondary battery 1, but also its initial discharging capacity and initial charge/discharge efficiency. When the coating is heated to a temperature lower than 100° C. or higher than 430° C., the effect of improving the initial discharging capacity and initial charge/discharge efficiency tends to become less than that in the case where the coating is heated to a temperature of 100 to 430° C.

The reason why the cycle characteristic, initial discharging capacity, and initial charge/discharge efficiency are improved when the active material layer is formed by heating the coating to a temperature of 100 to 430° C. has not completely been elucidated but is inferred as follows by the inventors.

Heating the coating to a temperature of 100 to 430° C. promotes the forming of hydrogen bonds between polybenzimidazole molecules in the coating and its resulting thermosetting of the active material layer, so as to make it harder for the active material layer to deform in response to temperature changes. This, the inventors think, makes the cycle characteristic easier to improve.

The inventors also consider that the positive electrode active material layer 28 obtained by heating the coating to a temperature of 100 to 430° C. is prevented from deforming, so as to enhance the reproducibility of Li ion inserting and desorbing processes, while the negative electrode active material layer 18 obtained by heating the coating to a temperature of 100 to 430° C. is easier to form a stable SEI coating. The inventors assume that the initial discharging capacity and initial charge/discharge efficiency improve as a result of the foregoing.

Next, the negative and positive leads 12, 22 are electrically connected to the negative and positive electrodes 10, 20, respectively. Then, the separator 40 is held between the negative electrode 10 and positive electrode 20, so as to form the power generating element 60. Here, the surface of the negative electrode 10 on the negative electrode active material layer 18 side and the surface of the positive electrode 20 on the positive electrode active material layer 28 side are brought into contact with the separator 40.

Next, the edge parts of the first and second films 51, 52 overlaid on each other are sealed with an adhesive or by heat sealing, so as to make the case 50. Here, for securing an opening for introducing the power generating element 60 into the case 50 in a later step, a portion of the edge parts is left unsealed. This yields the case 50 having the opening.

Subsequently, the power generating element 60 having the negative and positive electrode leads 12, 22 electrically connected thereto is inserted into the case 50 having the opening, and the electrolytic solution is injected therein. Then, while the negative and positive electrodes 12, 22 are partly inserted in the case 50, the opening of the case 50 is sealed, whereby the lithium-ion secondary battery 1 is completed.

Though a preferred embodiment of the present invention is explained in detail in the foregoing, the present invention is not limited thereto.

For example, though the above-mentioned embodiment illustrates electrodes used in a lithium-ion secondary battery, the electrode of the present invention may also be used in secondary batteries other than the lithium-ion secondary battery, and other electrochemical devices such as electrochemical capacitors exemplified by lithium capacitors. These electrochemical devices can also be used for power supplies for self-propelled micromachines, IC cards, and the like and decentralized power supplies placed on or within printed boards.

In the following, the present invention will be explained more specifically with reference to examples and comparative examples. However, the present invention is not limited to the following examples.

Example 1

Making of a Negative Electrode

Polybenzimidazole (manufactured by PBI Advanced Materials Co., Ltd. under the product name of MRS0810H) expressed by the following chemical formula (Ia) was dissolved in N,N-dimethylacetamide, so as to prepare a solution (hereinafter referred to as "negative electrode binder solution") containing 10 mass % of polybenzimidazole. Polybenzimidazole will be referred to as "PBI" hereinafter.

[Chem. 2]

(Ia)

A negative electrode coating material was prepared by mixing 88 g of silicon powder (manufactured by Aldrich Co.) as a negative electrode active material, 2 g of acetylene black as a conductive auxiliary, and 100 g of the negative electrode binder solution and stirring them. That is, the mass ratio of the silicon powder, acetylene black, and PBI contained in the negative electrode coating material was adjusted to 88:2:10.

The negative electrode coating material was applied onto an aluminum foil acting as a negative electrode current collector, so as to form a negative electrode coating on the negative electrode current collector. The resulting product was dried with a hot wind in the air, so as to heat the negative electrode coating to a temperature of 100° C. for 15 min, and then the heated product was extended by a roll press. This yielded the negative electrode of Example 1 comprising a negative electrode active material layer containing PBI and the negative electrode current collector. The amount of the negative electrode active material carried on the negative electrode current collector was adjusted to 2.2 mg/cm². The thickness of the extended negative electrode was adjusted to 16 μm.

Making of a Positive Electrode

A positive electrode coating material was prepared by mixing $Li(Ni_{1/3}Mn_{1/3}CO_{1/3})O_2$ as a positive electrode active material, acetylene black and graphite as conductive auxiliaries, polyvinylidene fluoride (PVdF) as a binder, and N-methyl-2-pyrrolidone (NMP) as a solvent and stirring them. The mass ratio of $Li(Ni_{1/3}Mn_{1/3}CO_{1/3})O_2$, acetylene black, graphite, and PVdF contained in the positive electrode coating material was adjusted to 92:2:3:3.

The positive electrode coating material was applied onto an aluminum foil acting as a positive electrode current collector, so as to form a positive electrode coating on the positive electrode current collector. After being dried, the positive electrode coating was extended by a roll press. This yielded a positive electrode comprising a positive electrode active material layer and the positive electrode current collector. The amount of the positive electrode active material carried on the positive electrode current collector was adjusted to 16.9 mg/cm². The thickness of the extended positive electrode was adjusted to 56 μm.

Making of an Evaluation Cell

Respective leads were electrically connected to the positive electrode and the negative electrode of Example 1. Subsequently, the negative electrode and positive electrode were arranged such that their active material layers opposed each other, and a separator was held between the negative and positive electrodes, so as to yield a power generating element. As the separator, one made of polyethylene was used.

The power generating element was inserted into a case of a battery, and an electrolytic solution was injected therein. While the negative and positive electrode leads were partly inserted in the case, the opening part of the case was sealed under vacuum, so as to complete the evaluation cell (lithium-ion secondary battery) of Example 1. Employed as the electrolytic solution was one dissolving 1.0 M of $LiPF_6$ in a mixed solvent of EC (ethylene carbonate) and DEC (diethyl carbonate) in which the volume ratio of EC and DEC was 3:7.

Example 2 to 6 and 8

The evaluation cells of Examples 2 to 6 and 8 were made by the same method as that of Example 1 except that the negative electrode coating was heated to respective temperatures listed in Table 1 instead of 100° C.

Example 7

The evaluation cell of Example 7 was made by the same method as that of Example 1 except that the negative electrode coating was dried for 48 hr at 25° C. instead of being heated to 100° C.

Comparative Example 1

The evaluation cell of Comparative Example 1 was made by the same method as that of Example 7 except that polyimide (product name: U-Varnish-A) manufactured by Ube Industries, Ltd. was used in place of PBI. Polyimide used in Comparative Example 1 will be referred to as "PI-1" hereinafter.

Comparative Example 2

The evaluation cell of Comparative Example 2 was made by the same method as that of Comparative Example 1 except that polyimide (product name: HR16NN) manufactured by Toyobo Co., Ltd. was used in place of PI-1. Polyimide used in Comparative Example 2 will be referred to as "PI-2" hereinafter.

Comparative Example 3

The evaluation cell of Comparative Example 3 was made by the same method as that of Comparative Example 1 except that PVdF was used in place of PI-1.

Example 9

PBI expressed by the above-mentioned chemical formula (Ia) was dissolved in NMP, so as to prepare a solution (hereinafter referred to as "positive electrode binder solution") containing 10 mass % of polybenzimidazole.

To 95 g of $Li(Ni_{1/3}Mn_{1/3}CO_{1/3})O_2$ as a positive electrode active material, 2 g of acetylene black as a conductive auxiliary were added, and then 30 g of the positive electrode binder solution were gradually added. They were mixed and stirred. A positive electrode coating material was thus prepared. That is, the mass ratio of $Li(Ni_{1/3}Mn_{1/3}CO_{1/3})O_2$, acetylene black, and PBI contained in the positive electrode coating material was adjusted to 95:2:3.

The positive electrode coating material was applied onto an aluminum foil acting as a positive electrode current collector, so as to form a positive electrode coating on the positive electrode current collector. The positive electrode coating was heated to 100° C. for 10 min by drying with a hot wind in the air, and then extended by a roll press. This yielded the positive electrode of Example 9 comprising a positive electrode active material containing PBI and the positive electrode current collector.

A negative electrode active material layer containing synthetic graphite as a negative electrode active material and PVdF as a binder in a mass ratio of 92:8 was formed on an aluminum foil acting as a negative electrode current collector, so as to yield a negative electrode.

Using the negative electrode and the positive electrode of Example 9, the evaluation cell of Example 9 was made by the same method as that of Example 1.

Comparative Example 4

The evaluation cell of Comparative Example 4 was made by the same method as that of Example 9 except that PVdF was used in place of PBI.

Evaluation

The initial charging capacity, initial discharging capacity, initial charge/discharge efficiency, and cycle characteristic were evaluated in each of the evaluation cells of Examples 1 to 9 and Comparative Examples 1 to 4. Tables 1 and 2 list the results. For evaluating the cycle characteristic, each evaluation cell was electrically charged at a rate of 1 C at 25° C. by constant-current, constant-voltage charging at 4.2 V and then was subjected to constant-current discharging to 2.5 V at a rate of 1 C at 25° C. Counting them as 1 cycle, 100 cycles were carried out. The ratio of the discharge capacity at the 100th cycle to that of the 1st cycle was determined as a cycle characteristic value. As the cycle characteristic value is greater, the evaluation cell is better in the cycle characteristic.

TABLE 1

| | | Comparative Example | | | Example | | | | | | | |
|---|---|---|---|---|---|---|---|---|---|---|---|---|
| | | 1 | 2 | 3 | 1 | 2 | 3 | 4 | 5 | 6 | 7 | 8 |
| Negative electrode coating | Binder | PI-1 | PI-2 | PVdF | PBI | PBI | PBI | PBI | PBI | PBI | PBI | PBI |
| | Heating temp. [° C.] | 25 | 25 | 25 | 100 | 220 | 250 | 350 | 400 | 430 | 25 | 570 |
| Init. charging capacity [mAh] | | 77.4 | 76.5 | 77.4 | 75.8 | 76.3 | 76.9 | 76.2 | 76.8 | 75.6 | 82.1 | 76.0 |
| Init. discharging capacity [mAh] | | 44.7 | 45.7 | 41.1 | 48.1 | 48.7 | 49.3 | 50.0 | 52.6 | 49.3 | 40.9 | 44.3 |
| Init. charge/discharge efficiency [%] | | 57.8 | 59.7 | 53.1 | 63.4 | 63.8 | 64.1 | 65.5 | 68.5 | 65.3 | 49.8 | 58.3 |
| Cycle characteristic [%] | | 14.3 | 7.8 | 52.6 | 60.4 | 67.0 | 72.4 | 75.7 | 78.3 | 73.5 | 56.6 | 60.7 |

TABLE 2

| | | Comparative Example 4 | Example 9 |
|---|---|---|---|
| Positive electrode coating | Binder | PVdF | PBI |
| | Heating temp. [° C.] | 100 | 100 |
| Init. charging capacity [mAh] | | 88.3 | 88.5 |
| Init. discharging capacity [mAh] | | 79.6 | 80.5 |
| Init. charge/discharge efficiency [%] | | 90.2 | 91.0 |
| Cycle characteristic [%] | | 92.3 | 95.6 |

As Table 1 indicates, it was verified that Examples 1 to 8 whose negative electrode active material layers contained PBI exhibited cycle characteristics superior to those of Comparative Examples 1 to 3 whose negative electrode active material layers contained no PBI.

Examples 1 to 6 whose negative electrode active material layers were formed by heating negative electrode coatings to 100 to 430° C. were seen to yield greater initial discharging capacities and initial charge/discharge efficiencies than those of Examples 7 and 8 and Comparative Examples 1 to 3.

As Table 2 indicates, it was verified that Example 9 whose positive electrode active material layer contained PBI exhibited greater initial charging capacity, initial discharging capacity, and initial charge/discharge efficiency than Comparative Example 4 whose positive electrode active material layer contained no PBI. It was also seen that Example 9 yielded a cycle characteristic superior to that of Comparative Example 4.

REFERENCE SIGNS LIST

1 . . . lithium-ion secondary battery; 10 . . . negative electrode; 12 . . . negative electrode lead; 14 . . . insulator; 16 . . . negative electrode current collector; 18 . . . negative electrode active material layer; 20 . . . positive electrode; 22 . . . positive electrode lead; 24 . . . insulator; 26 . . . positive electrode current collector; 28 . . . positive electrode active material layer; 40 . . . separator; 50 . . . case; 60 . . . power generating element

What is claimed is:

1. A lithium-ion secondary battery comprising:
a positive electrode that comprises:
  a current collector;
  an active material layer containing an active material and polybenzimidazole; and
  an insulating layer; and
a separator positioned on a surface of the active material layer;
wherein:
the insulating layer is formed on a surface of the active material layer that opposes the separator;
polybenzimidazole molecules are directly bonded via hydrogen bonds to other polybenzimidazole molecules in the active material layer;
the polybenzimidazole is present in the active material layer in an amount of 2 to 10 mass % based on a total mass of the active material layer;
the active material is present in the active material layer in an amount of 80 to 98 mass % based on the total mass of the active material layer; and
the active material is selected from the group consisting of: lithium titanate, lithium cobaltate, nickelate, lithium manganese spinel, mixed metal oxide represented by the general formula: $LiNi_xCo_yMn_zM1_aO_2$, lithium vanadium compound, olivine-type $LiM2PO_4$, and a combination thereof, where:
a sum of x, y, z, and a is 1;
x is greater than or equal to 0 and less than or equal to 1;
y is greater than or equal to 0 and less than or equal to 1;
z is greater than or equal to 0 and less than or equal to 1;
a is greater than or equal to 0 and less than or equal to 1;
M1 is at least one element selected from the group consisting of Al, Mg, Nb, Ti, Cu, Zn, and Cr, and
M2 is at least one selected from the group consisting of Co, Ni, Mn, Fe, Mg, Nb, Ti, Al, Zr, and VO.

2. The lithium-ion secondary battery according to claim 1, wherein a thickness of the insulating layer is from about 1 to 1000 nm.

3. The lithium-ion secondary battery according to claim 1, wherein the insulating layer includes a material selected from the group consisting of aluminum oxide, zirconium oxide, titanium oxide, silicon oxide, magnesium oxide, zinc oxide, iron oxide, copper oxide, and tin oxide.

4. The lithium-ion secondary battery according to claim 1, further comprising an electrolytic solution containing lithium ions.

5. A lithium-ion secondary battery comprising:
a negative electrode that comprises:
   a current collector; and
   an active material layer containing an active material and polybenzimidazole; and
   an insulating layer; and
a separator positioned on a surface of the active material layer;
wherein:
the insulating layer is formed on a surface of the active material layer that opposes the separator;
polybenzimidazole molecules are directly bonded via hydrogen bonds to other polybenzimidazole molecules in the active material layer;
the polybenzimidazole is present in the active material layer in an amount of 2 to 10 mass % based on a total mass of the active material layer;
the active material is present in the active material layer in an amount of 80 to 98 mass % based on the total mass of the active material layer; and
the active material is selected from the group consisting of: Si, Si alloy, alloy of Si and Cu, alloy of Si and Ni, alloy of Si and Ti, graphite, Al, Al alloy, Sn, Sn alloy, $SiO_x$, $SnO_x$, lithium titanate, $TiO_2$, and a combination thereof,
where x is greater than 1 and less than or equal to 2.

6. The lithium-ion secondary battery according to claim 5, further comprising an electrolytic solution containing lithium ions.

7. A method of manufacturing a lithium-ion secondary battery comprising:
manufacturing an electrode by:
   applying a coating material containing an active material and polybenzimidazole to a current collector, so as to form an active material layer made of the coating material on the current collector; and
   forming an insulating layer on a surface of the active material layer; and
providing a separator on a surface of the active material layer; and
wherein:
the insulating layer is formed on the surface of the active material layer that opposes the separator;
polybenzimidazole molecules are directly bonded via hydrogen bonds to other polybenzimidazole molecules in the active material layer;
the polybenzimidazole is present in the active material layer in an amount of 2 to 10 mass % based on a total mass of the active material layer;
the active material is present in the active material layer in an amount of 80 to 98 mass % based on the total mass of the active material layer; and
the active material is selected from the group consisting of: Si, Si alloy, alloy of Si and Cu, alloy of Si and Ni, alloy of Si and Ti, graphite, Al, Al alloy, Sn, Sn alloy, $SiO_x$, $SnO_x$, lithium titanate, $TiO_2$, cobaltate, lithium nickelate, lithium manganese spinel, mixed metal oxide represented by the general formula: $LiNi_qCo_yMn_zM1_aO_2$, lithium vanadium compound, olivine-type $LiM2PO_4$, and a combination thereof,
where:
x is greater than 1 and less than or equal to 2;
a sum of q, y, z, and a is 1;
q is greater than or equal to 0 and less than or equal to 1;
y is greater than or equal to 0 and less than or equal to 1;
z is greater than or equal to 0 and less than or equal to 1;
a is greater than or equal to 0 and less than or equal to 1;
M1 is at least one element selected from the group consisting of Al, Mg, Nb, Ti, Cu, Zn, and Cr; and
M2 is at least one selected from the group consisting of Co, Ni, Mn, Fe, Mg, Nb, Ti, Al, Zr, and VO.

8. The method of manufacturing a lithium-ion secondary battery according to claim 7, wherein manufacturing the electrode further comprises heating the active material layer to a temperature of 100 to 430° C.

9. The method of manufacturing a lithium-ion secondary battery according to claim 7, further comprising heating the active material layer to a temperature of 250 to 430° C.

10. The method according to claim 7, wherein the lithium-ion secondary battery comprises an electrolytic solution containing lithium ions.

* * * * *